United States Patent [19]

Hong

[11] Patent Number: 5,020,145
[45] Date of Patent: May 28, 1991

[54] AM/FM BAND SELECTOR

[75] Inventor: Yong P. Hong, Icheon-2dong, Rep. of Korea

[73] Assignee: Goldstar Co., Ltd., Seoul, Rep. of Korea

[21] Appl. No.: 138,950

[22] Filed: Dec. 29, 1987

[30] Foreign Application Priority Data

Dec. 29, 1986 [KR] Rep. of Korea ............... 21526/1986

[51] Int. Cl.⁵ ............................................. H04B 1/16
[52] U.S. Cl. .................................... 455/188; 455/189; 334/47
[58] Field of Search ............... 455/188, 190, 191, 189; 334/47, 60

[56] References Cited

U.S. PATENT DOCUMENTS

| | | | |
|---|---|---|---|
| 2,308,280 | 1/1943 | Green | 455/188 |
| 4,418,427 | 11/1983 | Muterspaugh | 455/188 X |
| 4,710,737 | 12/1987 | Matsuta | 455/188 X |

FOREIGN PATENT DOCUMENTS

| | | | |
|---|---|---|---|
| 54-30713 | 3/1979 | Japan | 455/188 |
| 59-57533 | 4/1984 | Japan | 455/188 |
| 59-128834 | 7/1984 | Japan | 455/188 |
| 861343 | 9/1986 | Rep. of Korea . | |

*Primary Examiner*—Benedict V. Safourek
*Assistant Examiner*—Ralph Smith

[57] ABSTRACT

An AM/FM band selector is provided for selecting AM and FM bands by a single band switch. By using only a single band switch, power consuming parts are eliminated so that power consumption of the selector is reduced. Also, impulse noise which occurs when selecting bands and switching on and off the power source is removed to provide an efficiently operating AM/FM band selector. The AM/FM band selector having a single band switch prevents simultaneous selection of AM and FM bands.

14 Claims, 3 Drawing Sheets

AM/FM BAND SELECTOR

BACKGROUND OF THE INVENTION

The present invention relates to an AM/FM band selector that can select AM/FM bands by means of a variable condensor resonance electronic switch. In particular, an electronic muting AM/FM band selector is presented that can eliminate impulse noise (pop-noise) occurring in the cut-off of a power supply or in the selection of an AM/FM band.

According to the conventional art as shown in FIG. 3, outputs of an AM receiver 31 and an FM receiver 32 are connected by analog switches 33, 34, 35, and 36 to outputs L and R, respectively. On the other hand, the power supply to the AM receiver 31 or the FM receiver 32 is selected by switches SW1 and SW2 which are connected to a flip flop 37 and includes NAND gates G1 and G2. While a capacitor C1 is charged upon an initial application of the power supply B+ by the source voltage, the outputs of inverters I1 and I2 become respectively "high" and "low" until the charge voltage reaches an operational voltage $V_{TH}$ of the inverter 1. Subsequently, the NAND gate G1 receives a "low" input and the NAND gate G2 receives a "high" input which causes the outputs of the NAND gates G1 and G2 to become "high" and "low", respectively. As a result, transistor Q5 becomes conductive so that transistor Q6 is turned OFF and transistor Q3 is not conductive so that transistor Q4 supplies power from B+ to the FM receiver 32. Thus, the FM receiver 32 is selected upon the initial application of power. Simultaneously, the output from the inverter I1 and the output from the NAND gate G2 become "high" through diode D5 so that the transistor Q2 is turned ON and lights a light-emitting diode LD2 to indicate the IN-OPERATION of the FM receiver 32. While the output of the NAND gate G2 becomes "low" and the transistor Q3 is turned OFF, the transistor Q4 is turned ON to apply the power source B+ to FM receiver 32. Furthermore, transistors Q9 and Q10 are conductive for eliminating impulse voltage and accordingly, impulse noise (pop-noise) at the initial application of the source B+ is eliminated.

Upon completing the charging of capacitor C1 after the initial operation, one input of the NAND gate G2 becomes "high" from the outputs of inverters I1 and I2 and the other input of the NAND gate G2 also becomes "high" to maintain the outputs of the NAND gates G1 and G2. The output of inverter I1 becomes "low" and is applied through diode D5 to the bases of transistors Q9 and Q10 so that transistors Q9 and Q10 are turned OFF. Thereby, the output of the FM receiver 32 is delayed for the charging time of the capacitor C1 which is applied through analog switches 35 and 36. Additionally, upon pressing the switch SW1 for switching FM/AM bands, the output state of the flip flop 37 changes and transistor Q7 becomes conductive at the moment of the state change so that the output of inverter I1 becomes "low" and transistors Q9 and Q10 conduct. Thus, the drive voltage at the control terminal of the analog switch is lowered and removes impulse noise in band switching. When the charging voltage of capacitor C1 reverses to less than the operational voltage $V_{TH}$ upon the cutting-off of the power supply, a low signal is applied to the output of NAND gates G1 and G2 for turning off the analog switch and removing impulse noise.

SUMMARY OF THE INVENTION

However, in the conventional art, the switches SW1 and SW2 for selecting AM or FM (i) require two band switches which occupy much more space; (ii) provide a simultaneous selection of AM and FM upon pressing switches SW1 and SW2, so that the outputs of NAND gates G1 and G2 become "low"; (iii) continue the electrostatic voltage supply that is not selected so that power is consumed and the output terminal of the positive edge detector is switched to an inverter; (iv) continue power supply from B+ to the inverter which consumes unnecessary power; and (v) the indicator for selecting AM and FM to use a separate drive circuit, which cause disadvantages in selecting AM or FM.

To eliminate these drawbacks in the conventional art, the present invention is designed to provide an AM/FM band selector that can select AM/FM bands by a single switch, remove noise when turning on and off the power supply or when selecting AM/FM bands and save power by reducing the power consumption to a minimum.

BRIEF DESCRIPTION OF THE DRAWINGS

The present invention will become more fully understood from the detailed description give hereinbelow and the accompanying drawings which are given by way of illustration only and thus, are not limitative of the present invention, and wherein.

Figure 1:
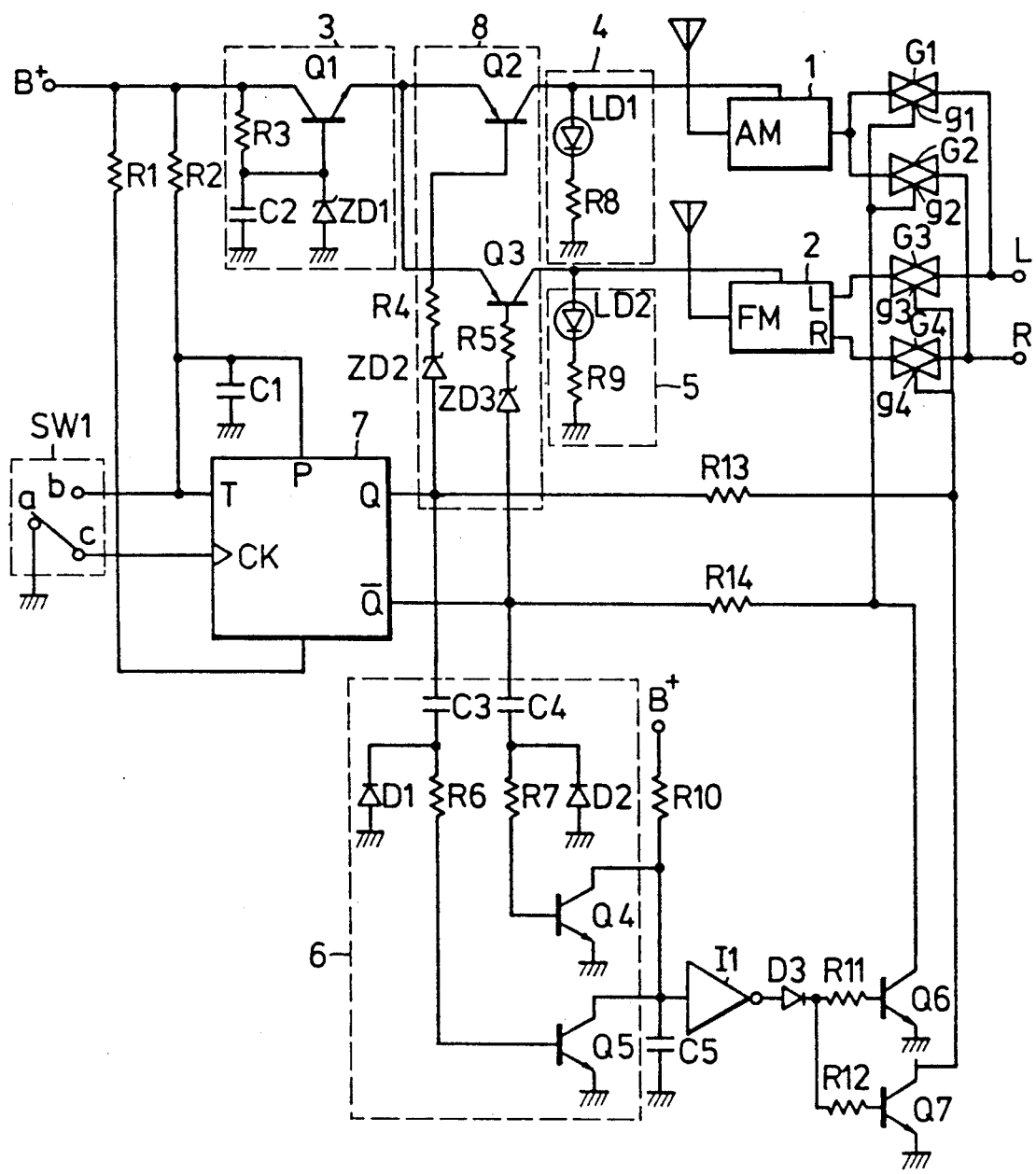
FIG. 1 illustrates a circuit of the present invention.

The numerals in the drawings indicate the following elements:

Numeral 1 indicates an AM receiver; numeral 2 indicates an FM receiver; numeral 3 indicates an electrostatic voltage section; numerals 4 and 5 represent indicators; numeral 6 represents a pulse positive polarity edge detector; numeral 7 represents a flip flop device; and numeral 8 represents a switch section.

DETAILED DESCRIPTION OF THE PRESENT INVENTION

In reference to the drawings, the structure and operation of the present invention shall be described in detail.

Referring to FIG. 1, the construction of an AM/FM band selector is shown. The outputs of an AM receiver 1 and an FM receiver 2 are connected through analog switches G1 and G2 to outputs L and R. Power is supplied from the source B+ by an electrostatic section 3 having a zener diode ZD1 and a transistor Q1. The transistor Q1 is connected to transistors Q2 and Q3 of a switch section 8 having transistors Q2 and Q3 and zener diodes ZD2 and ZD3. The outputs of the switch section 8 is connected to indicators 4 and 5. The indicators 4 and 5 include light-emitting diodes LD1 and LD2 which are connected to power source terminals of the AM receiver 1 and the FM receiver 2. The bases of transistors Q2 and Q3 in the switch section 8 are connected by zener diodes ZD2 and ZD3 to outputs Q and $\overline{Q}$ of a flip-flop 7, respectively. The outputs Q and $\overline{Q}$ are also connected to control terminals of analog switches G3, G4 and G1, G2, respectively. Also, the outputs Q and $\overline{Q}$ are connected via capacitors C3 and C4 to the bases of transistors Q4 and Q5 of a pulse positive polarity edge detector 6 which includes transistor Q4 and Q5, diodes D1 and D2 and capacitors C3 and C4. The output of the edge detector 6 is connected via a ground capacitor 5 and an inverter I1 to the bases of ground transistors Q6 and Q7. The collectors of transistors Q6 and Q7 are respectively connected to outputs Q and $\overline{Q}$ of the flip-flop 7. The clock input of the flip-flop 7 is connected to the movable contact (c) of a SW1 with the static contact (a) of the switch SW1 being grounded and the static contact (b) of the switch SW1 being connected to the input of the flip-flop 7.

Figure 2:
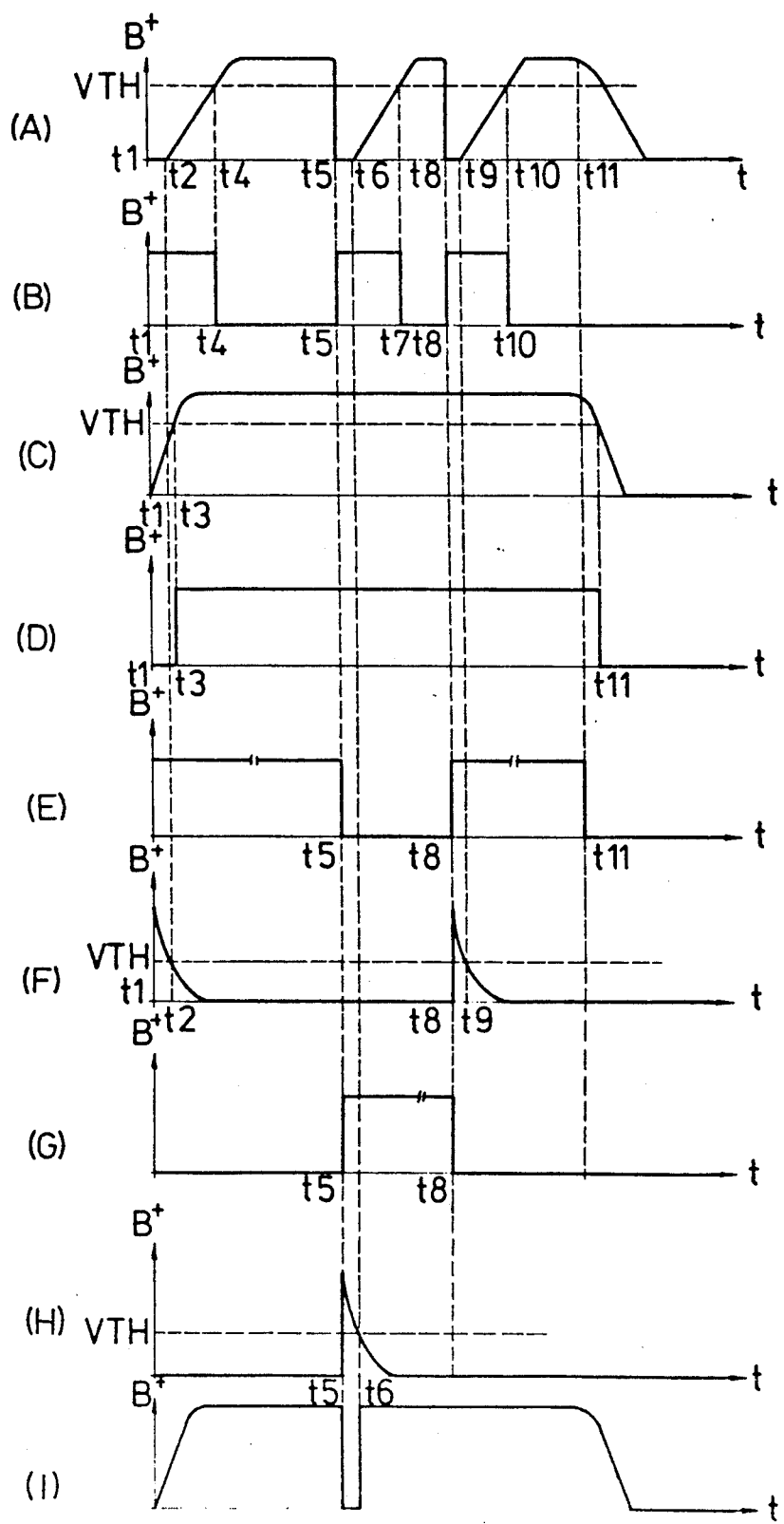
FIGS. 2(A) to (H) illustrates waveforms at respective sections of the circuit in FIG. 1.
Figure 3:
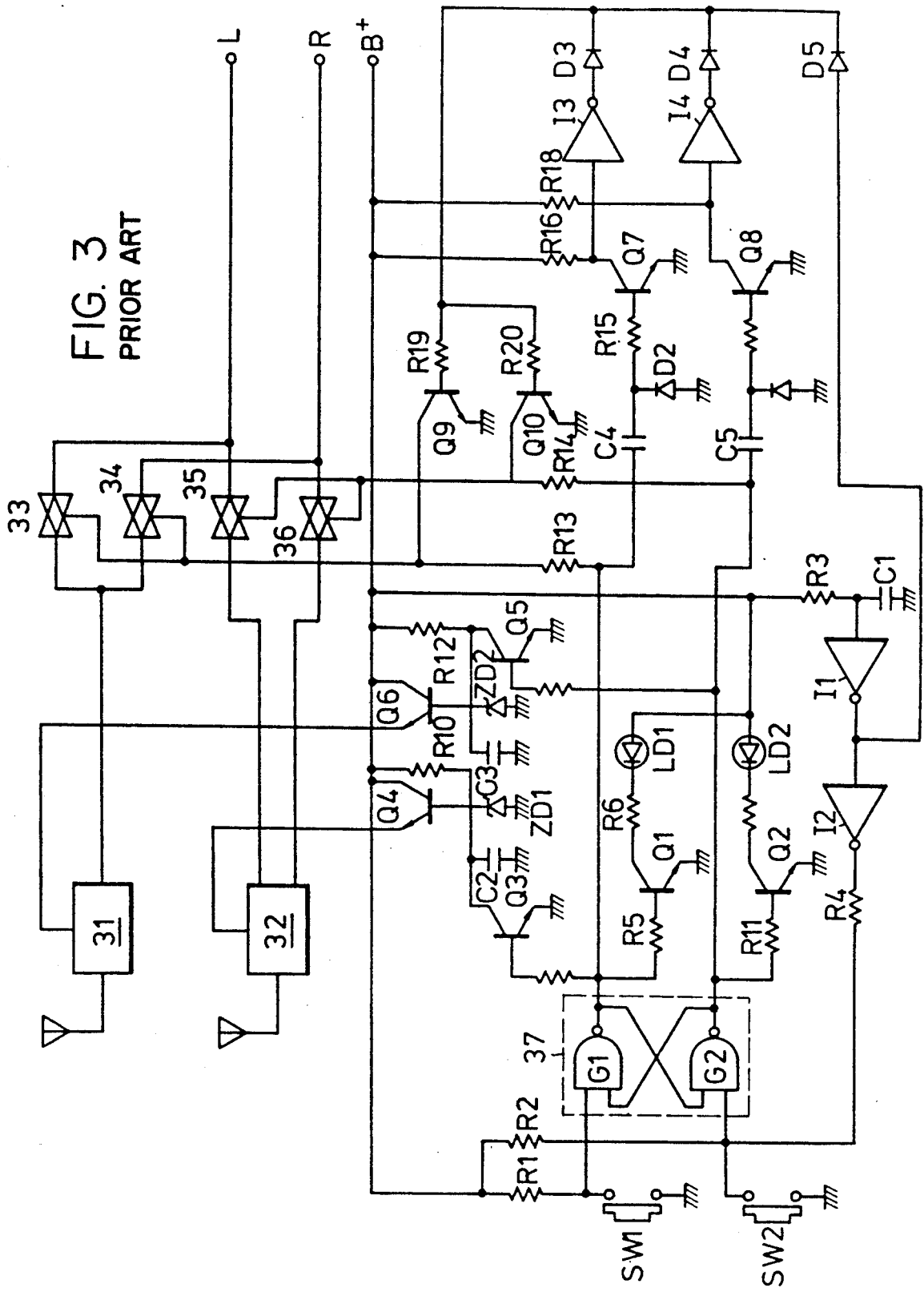
FIG. 3 shows a circuit for a conventional AM/FM band selector.

Referring to FIGS. 2 (A) to (H), the operation of the present invention will be further described as follows.

By applying power from the source B+ at a given time t1, as shown in FIGS. 2(A)–(H), power is supplied through resistor R2 to the input of the flip-flop 7 and to the preset input while the capacitor C1 begins to slowly charge, as shown in FIG. 2 (C). The capacitor C5 is charged by the source B+ through a resistor R10, as shown in FIG. 2 (A), and the source B+ is also applied to the input of the inverter I1. Therefore, the flip-flop 7 maintains a low potential when preset as shown in FIG. 2 (C) during the time t1–t3 when the charging voltage is below the operational voltage $V_{TH}$ so that regardless of the input T and the clock pulse CK to the flip-flop 7, the output Q of the flip-flop 7 maintains a high potential state, while the output $\overline{Q}$ keeps a low potential state (as shown in FIGS. 2 (F) and (G)), so that the FM band is selected upon applying the source B+. Only for the time t1–t4 when the charge voltage for the capacitor C5 is below the operational voltage $V_{TH}$ of the inverter I1, the output signal is at a high potential, as shown in FIG. 2 (B). However, the delay time of the fliP-flop 7 is too small to be compared and counted with the time constants of the resistor and capacitor in FIG. 2 (C). The high potential signal is applied through diode D3 and resistors R11 and R12 to transistors Q6 and Q7 and allows the transistors to conduct for supplying a low potential signal to the control input terminals. The control input terminals G1 to G4 include the analog switches G1 to G4 which turn off the switch and remove output noise upon the initial application of power from the source B+.

Furthermore the output Q of the flip-flop 7 is at a high potential and is applied to the pulse positive polarity edge detector 6 for turning the edge detector on for the time between t1 and t2 when the voltage is above the operational voltage $V_{TH}$ of the transistors, as shown in FIG. 2 (F). Therefore, the low potential signal is applied to the collector, i.e., the output of the transistor Q5, for the time between t1 and t2 and the capacitor C5 is discharged after being charged upon the initial power supply. At time t2 the capacitor C5 is charged again according to the time constant determined by R10 and C5 and impulse noise as explained before is removed. The time constant of resistor R2 and capacitor C1 are set to be less than the time constant of resistor R10 and capacitor C5. The high potential signal from output Q of the flip-flop 7 (FIG. 2 (E)) is applied to zener diode ZD2 for turning off transistor Q2. Also, the high potential signal from output Q of the flip-flop 7 is applied to the control terminals g3 and g4 of analog of analog switches G3 and G4 for turning the switches G3 and G4 on. Since output $\overline{Q}$ of the flip-flop 7 is a low potential as shown in FIG. 2 (G), the transistor Q3 of the switch section 8 is turned on and transmits the constant voltage of the constant power supply section 3 directly to the output collector of the transistor Q3. Thereby, power is supplied from B+ to the FM indicator 5 and the FM receiver 2 so that they are driven to transmit normal FM output signals to the outputs L and R.

When the input CK of the flip-flop 7, which is grounded by switch SW1 to the switch band at a given time t5 for selecting AM is connected to the input T, the same effect is produced, as when the clock pulse is applied to the input CK and the output of the flip-flop 7 toggles for keeping the output Q at a low potential and for keeping the output $\overline{Q}$ at a high potential (as shown in FIG. 2 (E) and (G)). Thus, the high potential signal of the output $\overline{Q}$ turns off transistor Q3 in the switching circuit section 8 which cuts off the FM receiver from the source. Simultaneously, the base of the transistor Q4 in the pulse positive polarity edge detector 6 conducts for a time between t5 and t6 when the voltage is above the operational voltage $V_{TH}$ of the transistor, as shown in FIG. 2 (H). As a result, the output of the transistor Q4 is at a low potential for momentarily discharging the voltage charged into the capacitor C5, as shown in FIG. 2 (A) and the capacitor C5 begins to charge at the time t6.

Meanwhile, the input of inverter I1 is below the operational voltage $V_{TH}$ for the period of time from t5 to t7 so that the output is produced, as shown in FIG. 2 (B). Impulse noise from channel switching is removed, as stated before, and the low potential signal of output Q turns on transistor Q2 in the switching section 8 for supplying power from B+ to the collector, i.e., output terminal. Thereby, power is supplied to the AM indicator 4, the AM receiver 1 and the light indicator 4. Furthermore, the high potential signal from the output Q of the flip-flop 7 supplies a high potential voltage to the control terminals of the analog switches G1 and G2 by the resistor 14 and turns the control terminals on for receiving normal AM signals.

When turning switch SW1 on or off at a given time t8 and selecting the FM band, the operation is performed in the same manner as described for the AM selection. Turning the power on at a given time t1 causes the output of the flip-flop 7 to be at a low potential signal, as shown in FIGS. 2 (E) and 2 (G) for turning off the control terminals g1–g4 of the analog switches G1–G4. As a result, the switches are turned off and impulse noise is removed when switching off the source B+.

As described above, according to the present invention, selecting FM or AM bands may be made by a single switch, and power consumption is reduced by eliminating power consuming parts. Also, impulse noise occurring when selecting bands and switching on and off the power source is removed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An AM/FM band selector comprising:
power supply means for supplying constant power from a power source;
a first switch for developing an AM source signal and an FM source signal;
switch means, operatively connected to said power supply means and said first switch, for supplying said constant power to either an AM receiver or an FM receiver according to said AM and FM source signals developed by said first switch;

pulse positive polarity edge detector means, operatively connected to said first switch, for instantaneously discharging a voltage of a first capacitor when said AM and FM source signals are toggled to produce a control signal; and a plurality of analog switches, operatively connected to said pulse positive polarity edge detector means, for controlling transmission of signals from said AM and FM receivers to an audio output device;

said analog switches selecting signals from either said AM receiver or said FM receiver to be transmitted to the audio output device in response to said control signal such that said analog switches eliminate impulse noise from being transmitted to the audio output device when selecting between an AM or FM band.

2. The AM/FM band selector as claimed in claim 1 further comprising:

display means, operatively connected to said second switch means, for indicating whether an AM band or an FM has been selected.

3. The AM/FM band selector as claimed in claim 2, wherein said display means includes at least one light emitting diode.

4. The AM/FM band selector as claimed in claim 1, wherein said pulse positive polarity edge detecting means comprises a flip-flop, at least three capacitors, and at least two transistors.

5. The AM/FM band selector as claimed in claim 1, wherein said pulse positive polarity edge detecting means comprises an inverter and at least two transistors.

6. The AM/FM band selector as claimed in claim 1, wherein said plurality of analog switches comprises at least four transmission gates.

7. An AM/FM band selector comprising:

AM receiving means for producing an AM output signal;

FM receiving means for producing an FM output signal;

power supply means for supplying power to said AM receiving means and said FM receiving means;

a band switch for producing an AM source indicating signal and a FM source indicating signal;

first switching means, operatively connected to said band switch, for supplying power from said power supply means to said AM receiving means in response to said AM source indicating signal and for supplying power to said FM receiving means in response to said FM source indicating signal;

pulse positive polarity edge detector means, operatively connected to said band switch, for developing an FM disabling signal in response to said AM source indicating signal and for developing an AM disabling signal in response to said FM source indicating signal;

AM indicating means for indicating an AM state in response to said first switching means supplying power to said AM receiving means;

FM indicating means for indicating an FM state in response to said first switching means supplying power to said FM receiving means;

second switching means, operatively connected to said pulse positive polarity edge detector means, for preventing transmission of said FM output signal in response to said FM disabling signal and for preventing transmission of said AM output signal in response to said AM disabling signal; and outputting means for outputting said AM output signal in response to said AM source indicating signal and for outputting said FM output signal in response to said FM source indicating signal;

said second switching means eliminating transmission of impulse noises to said outputting means when selecting between an AM or FM band.

8. An AM/FM band selector according to claim 7, wherein said power supply means comprises a power source, a first transistor and a first zener diode.

9. An AM/FM band selector according to claim 8, wherein said first switching means comprises second and third transistors connected to said first transistor and second and third zener diodes.

10. An AM/FM band selector according to claim 7, wherein said band switch comprises a switching device and a flip-flop device.

11. An AM/FM band selector according to claim 7, wherein said pulse positive polarity edge detector means comprises first, second, third and fourth transistors, first and second diodes, first, second, and third capacitors, and an inverter.

12. An AM/FM band selector according to claim 7, wherein said AM indicating means comprises a light emitting device.

13. An AM/FM band selector according to claim 7, wherein said FM indicating means comprises a light emitting device.

14. An AM/FM band selector according to claim 7, wherein said second switching means comprises first, second, third, and fourth analog switches.

* * * * *